United States Patent [19]

Rudko et al.

[11] Patent Number: 4,617,668
[45] Date of Patent: Oct. 14, 1986

[54] $CO_2$ TEA LASER

[75] Inventors: Robert I. Rudko, Holliston; James W. Barnie, Stoughton, both of Mass.

[73] Assignee: Raytheon Company, Lexington, Mass.

[21] Appl. No.: 731,619

[22] Filed: May 7, 1985

Related U.S. Application Data

[63] Continuation of Ser. No. 394,583, Jul. 2, 1982.

[51] Int. Cl.⁴ .................................................. H01S 3/22
[52] U.S. Cl. ......................................... 372/59; 372/87; 372/34; 372/61; 372/83
[58] Field of Search ................... 372/59, 89, 55, 61, 372/87, 98, 58, 83, 81, 92, 34; 313/556, 558

[56] References Cited

U.S. PATENT DOCUMENTS

| 4,150,343 | 4/1979 | Seelig et al. | 376/58 |
| 4,451,924 | 5/1984 | Lici et al. | 378/59 |
| 4,547,886 | 10/1985 | Kaminski et al. | |

FOREIGN PATENT DOCUMENTS 2107109 4/1983 United Kingdom .................. 372/87

OTHER PUBLICATIONS

Appl. Phys. Lett. 32(11), Jun. 1, 1978, "Sealed Multiatomosphere $CO_2$ TEA Laser: Seed-Gas Compatible System Using Unheated Oxide Catalyst" R. B. Gibson, A. Javan and K. Boyer pp.: 726–727.

Gibson et al., "Sealed Multiatmosphere $CO_2$ TEA Laser: Seed-Gas Compatible System Using Unheated Oxide Catalyst", App. Phys. Lett. 32(11), Jun. 1, '78.

Goto et al., "Construction of a Practical Sealed-Off He-I³⁰ Laser Device", 8056 Journal of Physics E Scientific Instruments, vol. 10, No. 3, 1977, pp. 292-295.

Primary Examiner—Leon Scott, Jr.
Attorney, Agent, or Firm—Richard M. Sharkansky

[57] ABSTRACT

In a laser using an electrical discharge produced between a pair of electrodes a catalyst is used for the recombination of gain medium components dissociated by the discharge. The catalyst material is confined by a catalyst container made of conductive material. The container has apertures smaller than the smallest catalyst particle and bigger than the molecule size of the gain medium. The conductive surface forms a cage which protects the catalyst, usually a powder, from the dispersing effects of the large electric fields present in the laser, and the aperture size allows the gain medium to contact the catalyst while preventing the catalyst powder from dispersing throughout the laser. The cage is placed adjacent the region in which the discharge takes place. Preferably, the cage is placed in contact with one of the electrodes in order to transfer heat from the electrode to the catalyst. With such an arrangement, the discharge is sufficient to cause a portion of the gain medium to pass over the catalyst and the increased temperature of the catalyst improves the effectiveness of the catalyst on the recombination rate.

10 Claims, 3 Drawing Figures

$CO_2$ TEA LASER

This application is a contination of application Ser. No. 394,583 filed July 2, 1982.

BACKGROUND OF THE INVENTION

The active medium in a $CO_2$ laser is a gas mixture of carbon dioxide, nitrogen, helium and, in some instances, other gases such as carbon monoxide or xenon. When an electrical discharge is formed in the gas to excite the active medium, some of the components in the mixture dissociate. In particular, $CO_2$ dissociates into CO and oxygen. The dissociation of the gas results in the depletion of the volume of active medium and is one of the primary reasons for failures in sealed $CO_2$ lasers.

Attempts at reducing the deleterious effects of gas dissociation have used techniques such as the use of large volumes of gas reserves, and catalysis of the dissociated components. The technique most often used in $CO_2$ lasers, is the use of catalysts to speed up the recombination of the dissociated components. Carbon monoxide and oxygen do not recombine at room temperature; under certain conditions, however, they will combine in the presence of certain catalysts. Platinum is the best known catalyst; however, it requires operation of the laser at elevated temperatures not feasible in a sealed $CO_2$ laser. Hopcalite, a commercially available mixture of magnesium oxide ($MnO_2$) and cuprous oxide ($CuO$), is sometimes used as a catalyst. The main problem is that the catalyst powder is found to disperse itself throughout the laser envelope and thus it degrades the performance of the laser, especially when a portion of the catalyst powder is deposited on the optics.

An article entitled "Sealed Multiatmosphere $CO_2$ TEA laser: Seed-Gas compatible system using unheated oxide catalyst" by R. B. Gibson et al., Appl. Phys. Letters 32(11), 1 June 1978, describes a laser system which confines the catalyst powder outside the main laser envelope and requires pumping to circulate the gas past the catalyst powder.

SUMMARY OF THE INVENTION

The present invention provides for a catalyst container which isolates the catalyst powder from the large electric fields present in the laser envelope and protects the catalyst medium from the shock wave, produced by an electric discharge between a pair of electrodes used to excite the gain medium of the laser, while allowing sufficient contact for catalysis to take place. The container is formed by a conductive solid housing and a conductive cover which is permeable to the gain medium and impervious to the catalyst medium contained therein. The container is placed within the main laser envelope in a region adjacent to the discharge region that provides for sufficient contact between the dissociated components formed by the discharge and the catalyst. Preferably, the container is in contact with one of the electrodes. With such an arrangement, the heat produced in the electrode by the electric discharge is transferred through the container to the catalyst medium, thus increasing the recombination rate.

BRIEF DESCRIPTION OF THE DRAWINGS

The present invention may be better understood as the description thereof progresses with reference to the accompanying drawings in which like numbers refer to like elements and wherein.

DESCRIPTION OF THE PREFERRED EMBODIMENT

Figure 1A:
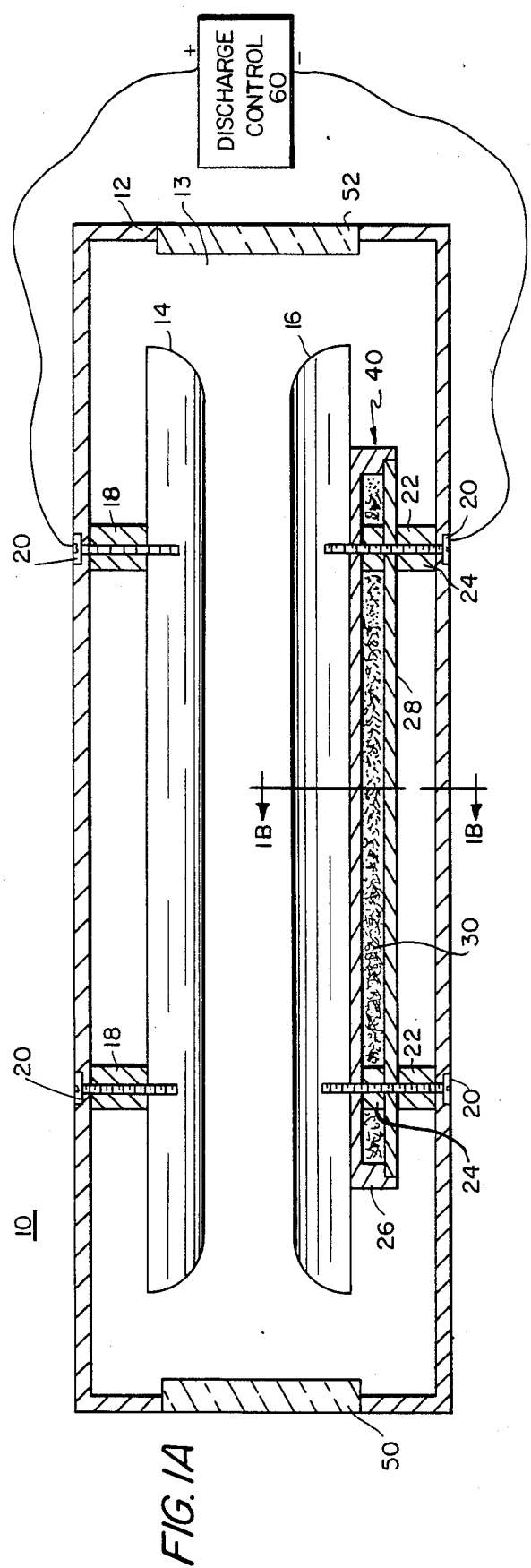
FIG. 1A is a cross-sectional view of a first embodiment of the invention.
Figure 1C:
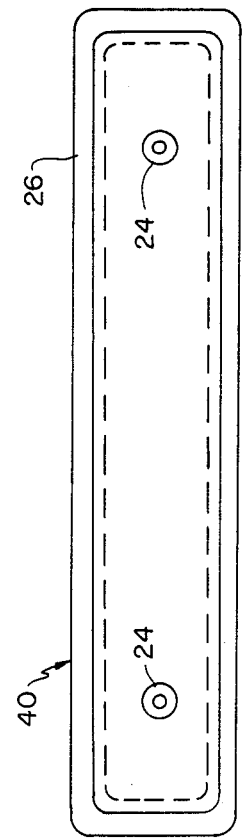
FIG. 1C is a top view of the catalyst container used in the embodiment of FIG. 1A.
Figure 1B:
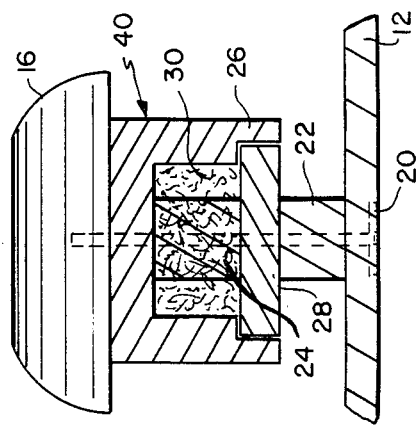
FIG. 1B is a sectional view taken along line 1B—1B in FIG. 1A.

Referring now to FIGS. 1A-1C, there is shown a sealed off $CO_2$ transverse electric atmospheric (TEA) laser 10. Envelope 12 is used to contain a gain medium 13 and two main electrodes 14 and 16. Electrode 14 is attached to one wall of envelope 12 and is separated therefrom by screws 20 and spacers 18. Electrode 16 is attached to an opposite wall of envelope 12 also with screws 20 and is spaced from the wall by the combination of spacers 22 and catalyst container 40. The relative size of spacers 18 and the size of spacers 22 and catalyst container 40 control the spacing of electrodes 14 and 16 and are selected to produce a predetermined spacing to suit the requirements of the specific application. Catalyst container 40 is formed by a trough shaped housing 26 and end cover 28. Housing 26 is made of a solid conductive material, such as aluminum, and cover 28 is made of a conductive material having apertures of a predetermined size, for example, a stainless steel screen having a predetermined mesh size. The function of cover 28 will be described in more detail later, suffice it to mention for now, however, that cover 28 must allow the gain medium 13 or components thereof, to pass freely therethrough, while preventing even the smallest particle of the catalyst from passing through to the outside of the container. Catalyst container 40 is assembled in laser envelope 12 by fastening the base of housing 26 to the back surface of one of the electrodes and by fastening, to the rim of housing 26, cover 28 and spacers 22. This is accomplished, for example, by screws 20 threaded through corresponding openings in laser envelope 12, housing 26, cover 28 and electrode 16. Spacers 24 are also used to add rigidity between cover 28 and the inner surface of housing 26, and to seal the contents of container 40 from the screw openings. Spacers 22 are used between cover 28 and the wall of envelope 12 to maintain a sufficient volume or space in which the gain medium 13 can circulate past and through cover 28. A catalyst medium 30 is placed within housing 26 and cover 28. A mixture of manganese oxide and cuprous oxide, such as Hopcalite may be used as the catalyst. It may be used in loose powder form or may be pressed into pellets of suitable size. The volume between catalyst cage 40 and electrode 16 enables the gain medium 13 to circulate and be in contact with cover 28 of the catalyst cage 40. The top cover 28 of catalyst 40 has a mesh size which is impervious to the catalyst powder but is permeable to the gain medium. Thus, the gain medium 13 can penetrate cover 28 and contact catalyst powder 30 but the smallest grain of catalyst powder 30 cannot pass through the top cover 28 and thus it can not contaminate gain medium 13 and deposit loose particles on the critical optical elements of a laser. Typically, a mesh size of 40 micrometers has been used.

Discharge control 60 is provided to produce a discharge between electrodes 14 and 16 used to excite gain medium 13 and thereby produce a laser pulse. When used in the resonator mode, a totally reflecting mirror 50 is placed on the optic axis of laser 10 at one end of envelope 12 and a partially transmitting mirror 52 is placed on the optic axis at the opposite end of envelope 12. In other applications, mirrors 50 and 52 may be replaced by optical output windows, whose planes may be positioned at the Brewster angle with respect to the optic axis to control the polarization of the output laser pulses, as is well known in the art.

During operation of the laser, the large electric fields present are found to result in the break up of the catalyst pellets 30 and have a dispersing effect on the catalyst powder, which degrades the operation of the laser, especially when the powder is deposited in the optical elements in the laser envelope 12. The electric discharge produced between electrodes 14 and 16 also produces a shock wave which leads to the same deleterious effects on the catalyst as those must mentioned above. Housing 26 and cover 28 effectively form a conductive cage, sometimes referred to as a Faraday cage, and it was found that this shielded catalyst medium 30 from the dispersing effects of the large electric fields present in the laser envelope. Container 40 also protects catalyst medium 30 from the shock wave produced by the discharge between the main electrodes 14 and 16 and prevents any catalyst particle from escaping the volume within container 40.

It is found that the gas turbulence created by the electric discharge between main electrodes 14 and 16 is sufficient to provide adequate contact between gain medium 13 and catalyst medium 30 when placed adjacent the discharge region. The location of elongated container 40 between one of the side walls of envelope 12 and electrode 16 also has the advantage of simplifying the mounting of container 40. By using screws 20 and spacers 22 and 24, a strong and reliably mounting of container 40 is achieved. Discharge control 60 provides the energy for the electric discharge between electrodes 14 and 16 and selectably controls its repetition rate. The repetition rate of the electric discharge is one of the variables that determine the temperature within the laser envelope. The MnO component of the catalyst powder is more effective at the lower temperature range encountered during the low-repetition rate operation of the laser, while the CuO component is more effective at the higher temperature range encountered during the high-repetition rate operation. In combination they provide for effective catalysis of the dissociated gases throughout a larger range of temperatures, allowing some flexibility in the choice of pulse repetition rate. The repetition rate of course is also limited by the fact that the gas dissociation rate due to the discharge cannot exceed the reassociation rate due to the catalyst.

As shown in FIGS. 1A-B, catalyst container 40 is in contact with electrode 16. This arrangement allows the heat from electrode 16 to be transferred to container 40 and in turn to catalyst medium 30. This effectively increases the temperature of catalyst medium 30 thereby increasing the effectiveness of the catalyst on the recombination rate. The discharge between electrodes 14 and 16 generates heat in the electrodes. If a DC discharge is used, it is found that the cathode generates more heat than the anode. Thus, to achieve the maximum recombination rate, catalyst container 40 should be in contact with the cathode, shown as electrode 16 in FIG. 1A. For discharge other than DC, the location of container 40 is not as critical, as long as it is effectively thermally coupled, i.e. by using conduction, to one of the electrodes. It should be understood that various modifications to the embodiment of the invention may be made by persons skilled in the art without departing from the spirit and scope of the invention. For instance, the actual location and particular shape of container 40 may be changed to suit a particular envelope design. Catalyst container 40 need only be proximate the discharge region and preferably thermally coupled to one of the electrodes. Accordingly, it is desired that this invention is not to be limited to the embodiments disclosed herein but is to be limited only as defined by the appended claims.

What is claimed:

1. In combination:
an active fluid gain medium;
a sealed resonant cavity surrounding said active fluid gain medium;
a catalyst disposed within said seal resonant cavity; and
means for protecting said catalyst from electric field and shock waves present in said sealed resonant cavity, said protecting means comprising a conductive container, the catalyst being disposed therein, said conductive container having a portion of a surface thereof permeably to said active fluid gain medium and impervious to said catalyst.

2. In combination in a laser:
an active fluid gain medium comprising at least one predetermined compound;
a discharge means for exciting said active fluid gain medium, said excitation stimulating dissociating a portion of the compound into at least two components;
catalyst means for aiding in recombination of said at least two components; and
a conductive container for holding said catalyst means therein, said conductive container having a portion of a surface thereof permeable to said active fluid gain medium and impermeable to said catalyst means.

3. A laser system comprising:
an active gain medium comprising a compound subject to dissociation into two components;
means for producing a discharge in said active fluid gain medium, said discharge dissociating a portion of the compound into the two components; and
means for recombining the dissociated components of said compound, said recombining means comprising a catalyst powder of predetermined particle size and a container having apertures of a size smaller than said particle size and bigger than the size of said dissociated components for adjacent said discharge producing means.

4. The laser cited in claim 3 further comprising:
means for controlling the temperature of said active fluid gain medium so as to maintain optimum temperature in the catalyst region.

5. The laser system of claim 3 further comprising:
means for selectably controlling the rate of said discharge of said producing means.

6. A laser system comprising:
a sealed laser envelope;
an active fluid gain medium disposed in said sealed laser envelope;
a pair of electrodes for generating a discharge between said electrodes in said active fluid gain medium;
a catalyst; and a conductive container for holding said catalyst, said conductive container having at least a portion of a surface thereof permeable to said active fluid gain medium and impervious to said catalyst, said container being disposed between one of said electrodes and a wall of said envelope with said active fluid gain medium permeable surface portion in contact with said active fluid gain medium.

7. The laser system of claim 6 further comprising: means coupled to said electrodes for controlling the repetition rate of said discharge between said electrodes.

8. The laser system of claim 6 wherein said container is thermally coupled to one of said electrodes.

9. The laser system of claim 6 wherein said container is in thermal contact with one of said electrodes.

10. The laser system of claim 9 wherein said electrode pair forms a cathode and an anode and said container is in contact with said cathode.

* * * * *